March 21, 1939.                M. J. JOHNSON                2,151,474
                              LIGHT VALVE CONTROL
                          Filed April 3, 1936            2 Sheets-Sheet 1
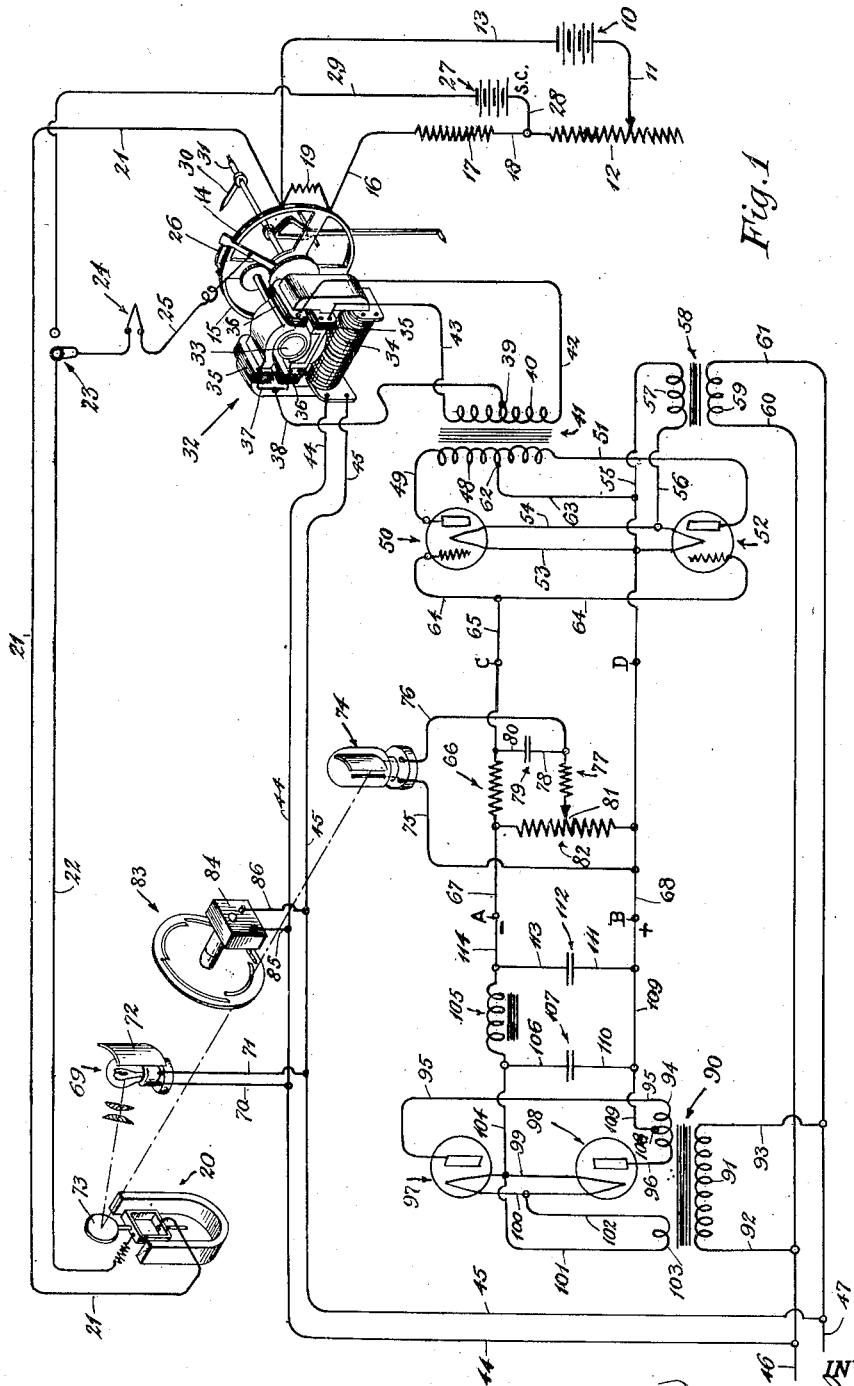

March 21, 1939.  M. J. JOHNSON  2,151,474
LIGHT VALVE CONTROL
Filed April 3, 1936  2 Sheets-Sheet 2
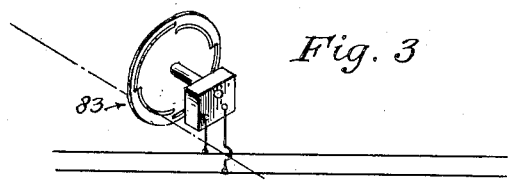
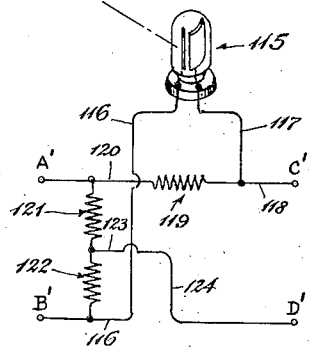
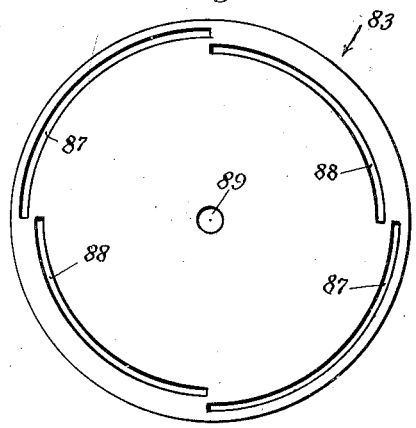
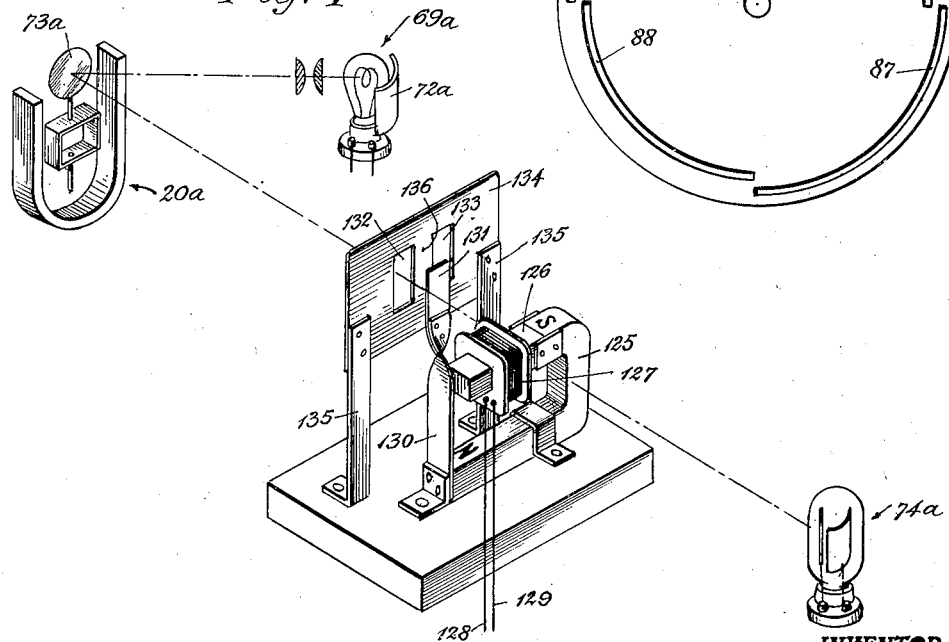

Patented Mar. 21, 1939

2,151,474

UNITED STATES PATENT OFFICE 2,151,474

LIGHT VALVE CONTROL

Manfred J. Johnson, Naugatuck, Conn., assignor of one-half to The Lewis Engineering Company, Naugatuck, Conn.

Application April 3, 1936, Serial No. 72,670

35 Claims. (Cl. 250—41.5)

REISSUED
MAY 20 1941

This invention relates to controls for potentiometer systems and the like, and more particularly to a continuously balancing controlled potentiometer for indicating and recording unknown quantities such as temperatures, and for controlling the operation of apparatus so as to maintain predetermined conditions, as in a furnace.

An object of this invention is to provide an improved control for recording potentiometers and the like which is particularly quick-acting and accurate, and which can be made very small and compact with economy of manufacture.

In carrying out the above object the present invention provides, with a potentiometer circuit, a continuously balancing control apparatus utilizing solely one photo sensitive cell and a light beam, the latter being shifted by a small mirror carried by a galvanometer.

It is disclosed in my Patent No. 1,910,340 to adjust the slide wire of a potentiometer system by an ordinary reversible electric motor under the control of the directional movements of a galvanometer through periodic contacts actuated by the galvanometer.

In this prior proposal, the current was sent to the motor through the galvanometer needle and cooperating contacts, and this resulted in considerable arcing between the contacts. Also, the motor was not in all cases instantaneous in its action, as to starting and stopping. These difficulties were to a large measure obviated by my more recent invention disclosed in Patent No. 1,971,313. In the latter, the directional contacts which cooperate with the galvanometer needle-contact controlled the grid circuits of thermionic devices or vacuum tubes, and in doing so caused the plate currents to operate a reversing clutch in one direction or the other according to which directional contact was engaged.

In my application Serial No. 35,151, filed August 7, 1935, I have disclosed the use of a reversible shaded-pole, A. C. induction motor for adjusting the slide wire, pointer, ruling pen, or other device of the potentiometer circuit, while, at the same time employing thermionic devices to control the motor.

In this prior application, the galvanometer needle makes contact periodically with either of two metal strips carried by a drum which rotates, so as to control the grids of the thermionic devices, which latter in turn control the rotation of the motor. While this arrangement was a considerable improvement over the disclosures in my prior patent, it still had the disadvantage of using periodic contacts which resulted in a more or less step by step adjustment of the slide wire and other devices.

I have found that it is possible, as shown in one embodiment of the present invention, to control the grids of the thermionic devices according to the directional movements of the galvanometer by using only one light sensitive cell and a beam of light, which latter is directed by the movements of the galvanometer, and by periodically interrupting said beam of light by a shutter device synchronized with the impulses which energize the thermionic devices. By this means there has been obviated the step by step adjustment of the reversible shaded-pole motor due to the periodic galvanometer contacts, and provided instead a continuously balancing control which enables a much quicker and more accurate adjustment of the potentiometer circuit, and of the devices to be controlled thereby.

In carrying out my invention, as embodied in a potentiometer circuit, I connect the wire-wound shading coils of the shaded-pole motor which controls the slide wire and other devices, through suitable transformer coupling, to the plates of the thermionic devices, and connect the grids of these latter in circuit with a light sensitive cell and a suitable source of direct current energy, and provide a light beam interrupting device so that impulses of the cell due to properly controlled light striking thereon will cause to function either of said thermionic devices, which ever is in condition, as determined by its plate energization, to function at that time.

The thermionic devices are so connected with the photo electric cell that impulses from the latter can affect equally the charge on both the grids of said devices, and the plates of these devices are energized through transformer coupling from the shading coils of the A. C. motor in such manner that at any instant, except for zero polarity, said plates will be oppositely charged, or will be in phase opposition. It will be noted that only when the plate of a thermionic device has a positive charge, is that device in condition to function, and therefore, according to the above circuit, in order to have only one particular thermionic device function for a given period of time, proper charges are impressed on the grids of the devices only during the intervals when the plate of the particular device chosen to function is positive.

For light energization of the photo electric cell a continuous source of light is employed, this being reflected by a mirror attached to the galvanometer coil, and onto the photo sensitive cell.

For the purposes of the present invention, I provide a synchronous shutter interposed between the source of light and the light sensitive cell, and this shutter is adapted to cut off the light from the photo cell at predetermined periodic intervals during deflection of the galvanometer and mirror, and is adapted to shut off the light completely for zero or no-deflection position of the galvanometer.

The light which reaches the photo electric cell is therefore interrupted by means of the shutter and according to the direction of the deflection of the galvanometer so as to cause periodic charges to be impressed on the grids of the thermionic devices, such that that device will function which causes movement of the motor controlling the slide wire in a direction to balance the potentiometer circuit, and to thereby cause consequent return of the galvanometer to zero position.

In accomplishing this control, as embodied in the potentiometer system, the shutter is synchronized with the alternating current energization of the thermionic devices in such a manner that for a given direction of deflection of the galvanometer, light will be permitted to strike the photo sensitive cell only during the periods when one particular thermionic device has its plate positively charged and is therefore in condition to function. This device, in functioning, causes a loading of one set of shading coils of the motor, and this loading results in rotation of said motor in one direction.

When the galvanometer deflects in the opposite direction, the light striking the photo cell will be so timed, by means of the synchronized shutter, as to cause to function the other thermionic device, resulting in a loading of the other pair of shading coils of the motor, and consequent movement of the latter in the opposite direction.

It should be noted that the interruptions in the light beam by the synchronous shutter are of such rapid frequency that there will be effected a continuous movement of the adjusting motor when either of the thermionic devices is functioning to cause rotation thereof.

When the potentiometer circuit is in a balanced condition there will be obviously no deflection of the galvanometer, and the beam of light which is reflected from the mirror carried thereby will be at all times prevented from striking the photo sensitive cell by a light obstructing portion of the synchronous shutter, and therefore since no impulses will be impressed on the grids of the thermionic devices these will not function, and the motor and attached slide wire will remain at rest.

It is thus seen that the present invention provides by means of solely one photo sensitive cell and a synchronized shutter interrupting a light beam, a continuously balancing exceptionally quick-acting and sensitive control for potentiometer circuits or other systems, and a control which is extremely accurate.

It is not desired to limit the single photo cell control of the present invention to the embodiments thereof shown herein, these latter being merely by way of exemplification, the scope of this invention being more properly taken in connection with appended claims.

In one embodiment of the present invention there is shown a synchronized shutter which includes a circular disk having pairs of arcuate slots therein, the slots of each pair being oppositely disposed of the center, and each pair being angularly disposed at 90° to the other. Each slot is of a length to extend an angular distance of 90°, and the disk is rotated at a synchronous speed by means of a synchronous motor.

Another embodiment of the present invention provides a synchronized shutter which includes a steel reed having a light obstructing portion moving before windows in a metal plate, the reed vibrating in front of a soft-iron pole piece attached to a permanent magnet, and according to the impulses of an A. C. coil carried by said pole piece.

The present invention is also not to be limited to the particular type of shutter disclosed, and any other suitable type of synchronized shutter may be used between the photo sensitive cell and the source of light for said cell.

Also, no limitations are intended to be indicated by the particular type of photo sensitive cell shown, and the herein disclosed embodiments are merely for illustrative purposes.

Other features and advantages will hereinafter appear.

In the accompanying drawings:

Figure 1 shows one embodiment of the present invention, and pictures a source of light, galvanometer, synchronous shutter disk, and photo sensitive cell in their approximate physical relationship, and also a diagrammatic representation of the circuits and apparatus associated therewith.

Fig. 2 is a plan view of the disk used in the synchronous shutter shown in Fig. 1.

Fig. 3 shows the connections for a conductive type of photo electric cell.

Fig. 4 is a perspective view of a vibrating reed type of synchronous shutter and the approximate physical relation of this with a source of light, a galvanometer and a photo sensitive cell.

Referring now to the system diagrammatically illustrated in Fig. 1, the potentiometer circuit which is used with the thermocouple or other source of voltage varied according to a change of conditions includes a primary source of energy in the form of a battery 10 which is connected by means of a wire 11 to a variable calibrating resistance 12, and by means of a wire 13 to one end of a slide wire 14 mounted on the periphery of a stationary disk 15. The other end of the slide wire 14 is connected by a wire 16 to a resistor 17 which in turn is connected by a wire 18 to the other end of the calibrating resistance 12. A resistor 19 is shunted across the slide wire 14 for the purpose of reducing the voltage drop across the latter. A complete circuit is thus formed through the slide wire 14 and shunted resistance 19, the resistor 17, the calibrating resistance 12, and the battery 10 and current flows through this circuit as a result.

A galvanometer 20 is attached by means of a wire 21 to one end of the slide wire 14, and by means of a wire 22 through a switch 23 to a thermocouple 24 which in turn is connected by a wire 25 to a slider 26 which moves around the disk 15 and contacts with the slide wire 14. Thus the galvanometer 20 and the thermocouple 24 are shunted across a portion of the slide wire 14, as determined by the position of the slider 26, and it is possible, by adjustment of said slider and the calibrating resistance 12, to secure a balanced condition such that no deflection of the galvanometer results. For the purpose of checking the potential drop across the slide wire 14 of the potentiometer circuit just described, a standard cell 27 is connected by means of a wire 28 to the wire 18, and by means of a wire 29 to an alternative contact of the switch 23.

It will be readily understood that, for a condition of no deflection of the galvanometer 20, the slider 26 may have various positions, these positions corresponding to various temperatures to which the thermocouple 24 is subjected. A pointer 30 is carried on a shaft 31 which is attached to the slider 26, and therefore various positions of the pointer 30 may be made to indicate various temperatures of the thermocouple 24.

I have disclosed in my application Serial No. 35,151, filed August 7, 1935, the use of a reversible shaded-pole alternating current motor controlled by thermionic devices, which in turn were under the control of movements of the galvanometer, the motor being employed to move the slider of the potentiometer system.

The system diagrammatically illustrated in Fig. 1 employs a similar induction motor 32 under the control of similar thermionic devices, said motor having a squirrel cage rotor 33 and a continuously energized A. C. field 34. The motor 32 has a pair of oppositely disposed shading coils 35 connected in series and a second pair of oppositely disposed shading coils 36 also connected in series. The shading coils 35 and 36 are so disposed on the pole pieces of the motor that loading of one set of shading coils will cause rotation of the motor in one direction, and loading of the other set of shading coils will cause rotation of the motor in the other direction.

One end of the series-connected coils 35 is joined by means of a wire 37 to one end of the series-connected coils 36, and this juncture is connected by means of a wire 38 to the center tap 39 of the primary winding 40 of a transformer 41. One end of the primary winding 40 is connected by a wire 42 to the remaining end of the series-connected shading coils 36 and the other end of the primary winding 40 is connected by means of a wire 43 to the remaining end of the series-connected shading coils 35.

The transformer 41 is used to couple the plates of thermionic devices to the shading coils, as hereinafter disclosed. By virtue of the constant A. C. energization of the field 34 of the motor there will be voltages induced in the shading coils 35 and 36 thereof and these voltages will be impressed on the primary 40 of the transformer 41 and will result in a continuous energization of said transformer, which energization is of the same frequency as that of the field 34, and has a definite phase relationship thereto.

The field 34 of the motor is connected by wires 44 and 45 to main A. C. supply wires 46 and 47, and therefore the energization of the transformer 41 has a definite phase relationship with the energy carried by these supply wires.

The transformer 41 has a secondary coil 48 having one end connected by a wire 49 to the plate or anode of a thermionic device 50, and having the other end connected by a wire 51 to the plate of a thermionic device 52. The thermionic devices 50 and 52 are of the three-electrode type, each having a filament, a grid, and a plate.

There is thus impressed on the plates of the thermionic devices 50 and 52 an alternating voltage from the transformer 41, and at any instant the polarity of one plate will be opposite to the polarity of the other plate and the charges thereon will alternate in phase with the energy of the supply wires 46 and 47. The filaments of the thermionic devices 50 and 52 are connected in parallel by wires 53 and 54, and these latter are respectively connected by wires 55 and 56 to the secondary 57 of a filament supply transformer 58, the primary 59 of which is connected by wires 60 and 61 to the supply wires 46 and 47 respectively.

The secondary 48 of the transformer 41 has a center tap 62 which is connected by a wire 63 to the wire 55 which leads from the filament transformer, and therefore the charges impressed on the plates of the thermionic devices 50 and 52 are measured substantially with reference to the filaments of these devices.

The grids of the thermionic devices 50 and 52 are connected together by a wire 64, and this wire is connected, through a wire 65 and a suitable grid resistor 66 and a wire 67, to the point A, representing the negative side of a suitable source of direct current energy supply to be hereinafter described. The positive side of this source of D. C. energy, point B, is connected by a wire 68 to the common connector 53 of the filaments of the thermionic devices, and therefore the grids of said devices have impressed on them a negative charge with respect to the filaments, the magnitude of which charge is sufficient to limit the plate currents to a small value.

It may be seen that by impressing at properly-timed intervals a suitable positive charge on the grids of the thermionic devices 50 and 52, that device which has its plate positive during said intervals will be made to function, and will, through the transformer coupling means 41, load its associated shading coils of the motor and cause rotation thereof.

Functioning of the thermionic device 50 will cause rotation of the motor in one direction, and functioning of the thermionic device 52 will cause rotation of the motor in the opposite direction.

The present invention is primarily concerned with the method of, and means for, controlling rotation of the motor directionally in accordance with the direction of deflection of a deflectable member. In the present embodiment, this includes causing to function the thermionic devices 50 and 52, using solely one photo sensitive cell by impressing charges on the grids of said devices in accordance with the off-zero movements of the galvanometer 20 and such that deflection of the galvanometer in one direction will cause to function one of said thermionic devices, and deflection of the galvanometer in the other direction will cause to function the other of said thermionic devices.

For this purpose there is provided a unique form of control including a beam of light reflected by a mirror attached to the galvanometer, and reflected through a synchronized shutter onto a photo sensitive cell which is in circuit with the grids of the thermionic devices.

In the embodiment of Fig. 1, there is provided a source of light 69 which is preferably in the form of an incandescent bulb connected by wires 70 and 71 through the wires 44 and 45 to the supply wires 46 and 47. The source of light 69 has a reflector 72 associated therewith for directing a beam of light against the mirror 73 attached to the coil of the galvanometer 20, and the light 69 and mirror 73 are so disposed that the beam of light is reflected toward a photo sensitive cell 74, of the emissive type.

The photo sensitive cell 74 has one terminal connected by a wire 75 to the wire 68 which joins to the common filament connection of the thermionic devices, and has the other terminal connected by a wire 76 to a resistor 77 and, through a wire 78, to a grid condenser 79. The condenser 79 has its remaining terminal connected by a wire 80 to the wire 65 which is joined with the grid resistor 66, and the remaining terminal of the resistor 77 is connected across the wires 67 and 68 of the direct current supply.

By so connecting the photo sensitive cell 74 in the grid circuits of the thermionic devices 50 and 52, light, in striking said cell, will cause a charge therefrom which will have the effect of reducing the negative polarity of the grids and in some cases even resulting in grids of zero or slightly positive polarity. From the academic standpoint, a steady light, in striking the photo sensitive cell 74 will so affect the grids that the thermionic devices 50 and 52 will function whenever their plates are positively charged, and since these latter are in phase opposition, one device will start to function as soon as the other device has stopped functioning and so on, the devices alternately functioning in step with the alternations of the plate charges.

However, for the practical purposes of its objectives, the present invention provides for intermittently breaking or cutting the beam of light from the galvanometer 20 to the photo sensitive cell 74 by means of a synchronized shutter in such a manner that light will strike said cell at properly timed intervals so as to cause to function only one of the thermionic devices, the particular device chosen being according to the direction of deflection of the galvanometer, and for zero deflection of the galvanometer the light will be completely shut off from the cell. Thus if the galvanometer is deflected to the left, light will strike the photo sensitive cell only at those times during which a positively charged plate exists in that thermionic device which when functioning loads the shading coils of the motor so as to move the slider 26 in the direction required to lessen the left deflection of the galvanometer. It follows also that a right deflection of the galvanometer would, as a consequence, makes the photo sensitive cell cause to function the other thermionic device, which causes the motor to rotate the slider 26 so as to lessen the right deflection of the galvanometer. Thus there is effected a balancing of the potentiometer circuit, and it is to be noted that the frequency of interruption of the light beam is sufficiently high so that the movement of the motor, in balancing the circuit is not a step by step movement, but is of a substantially continuous nature.

The embodiment of the present invention shown in Fig. 1 provides for intermittently interrupting the light beam by using a synchronized shutter including a disk 83, which is rotated at a synchronous speed having a constant phase relationship with the energization of the motor 32 by means of a synchronous motor 84 connected by wires 85 and 86 to the wires 44 and 45 which receive energy from the common A. C. supply wires 46 and 47. The disk 83, see Fig. 2, has two pairs of arcuate-shaped slots 87 and 88 disposed therein about the periphery thereof, the slots of each pair being oppositely disposed of the center 89 of the disk, and each pair being angularly displaced 90° from the other. Each slot of a pair has a length such that it extends through an angular displacement of 90°, or the equivalent of a quadrant of a circle.

Also, the slots of one pair are disposed closer to the center 89 than are the slots of the other pair by a radial distance substantially equal to twice the width of a slot.

When the disk is rotating, there is thus provided between the annular areas covered by the outer slots 87 and the inner slots 88 a solid portion which forms a barrier for light reflected from the mirror of the galvanometer, the width of said barrier portion being substantially, therefore, equal to the width of a slot.

The disk 83 is so adjusted upon the shaft of the motor 84 that the outer pair of slots 87 will permit light from the galvanometer, when deflected to the left, to strike the photo sensitive cell 74 only during those periods when the plate of one of the thermionic devices is positive and therefore when that device is in condition to function so as to cause rotation of the motor 32, and that thermionic device is chosen which will cause the slider 26 to move in a direction which will reduce the left deflection of the galvanometer. Therefore, the inner pair of slots 88 of the disk 83 will permit light from the galvanometer mirror, when deflected to the right, to strike the photo sensitive cell only during those periods when the other of said thermionic devices is in a position to function by virtue of its plate being positive, and to cause a movement of the slider 26 such that the right deflection of the galvanometer will be lessened. Of course, for a balanced condition of the potentiometer circuit and zero position of the galvanometer, light from the mirror attached thereto will be prevented from reaching the photo sensitive cell 74 because of the obstruction offered to it by the solid barrier portions of the disk 83 intermediate the areas covered by the both pairs of slots therein.

The balancing operations as directed by the deflection of the galvanometer and using solely the one photo sensitive cell will be quickly responsive to the unbalance of the potentiometer circuit, and by virtue of this and the continuously acting nature of the control movement as outlined, there is made possible an accurate and rapid indicating and recording instrument of economical manufacture.

In order to maintain the grids of the thermionic devices normally negative, there is shown in Fig. 1 a rectifier and filter receiving energy from the main supply wires and having its negative side connected at A to the wire 67, and its positive side connected at B to the wire 68. This direct current supply for the grid circuit includes a transformer 90 having a primary winding 91 connected by wires 92 and 93 to the supply wires 46 and 47, and having a secondary winding 94 having its ends connected by wires 95 and 96 to the anodes or plates of rectifier tubes 97 and 98. The filaments of the tubes 97 and 98 are connected in parallel by wires 99 and 100, which are joined respectively by wires 101 and 102 to a filament winding 103 of the transformer 90.

The juncture of the wires 99 and 101 is connected by a wire 104 to a choke coil 105, and through a wire 106 to a filter condenser 107. The secondary 94 of the transformer has a center tap 108 connected by a wire 109 to the wire 68 of the grid circuit. The remaining terminal of the condenser 107 is connected by a wire 110 to the wire 109, and this latter is also connected by a wire 111 to a second filter condenser 112 which has its remaining terminal connected through a wire 113 to the choke coil 105. A wire 114 connects the choke coil 105 with the wire 67 of the grid circuit. There is thus provided a means for maintaining the grids of the thermionic devices 50 and 52 at a negative potential with respect to the filaments thereof, so that said devices are normally inoperative due to limited or no-plate current. It should be understood that any other suitable supply of direct current energy, such as a battery, may be connected between the points A and B in place of the rectifier and filter just described.

Another embodiment of the present invention, as shown in Fig. 3 discloses the use of a conducting type of photo sensitive cell, in place of the emissive type shown in Fig. 1. It is desired, however, that the present invention be not limited to the specific type of light sensitive cell or connections disclosed herewith.

Fig. 3 shows a photo sensitive cell 115 of the conductive type receiving light which is intermittently interrupted by a rotary synchronous shutter, such as 63 of Fig. 1. The cell 115 has associated with it a suitable circuit having terminal points A', B', C' and D', and the cell and circuit may be substituted in entirety for the cell 74 and its associated circuit of Fig. 1 included between the letters A, B, C and D.

One terminal of the cell 115 is connected by a wire 116 to the point B' for connection with the positive side of the grid energy supply, and the other terminal is connected by a wire 117 to a wire 118 leading to C', for connection to the grids of the thermionic devices. The wire 118 connects with a grid resistor 119, the other terminal of which is connected by a wire 120 to the point A'.

Two resistors 121 and 122 have a common connection 123 which is joined by a wire 124 to the point D', and the remaining ends of these resistors are respectively connected to the wires 120 and 116. Light which strikes the photo sensitive cell 115 will cause an impulse which reduces the negative charges on the grids of the thermionic devices controlled by said cell.

The action of the light beam control using the conductive type of photo sensitive cell 115 is similar to the action with the emissive type of cell 74 as described.

In Fig. 4 is shown another form of synchronous shutter for use in the light beam control of the present invention. This shutter is interposed between the light-sensitive cell 74a and the mirror 73a of the galvanometer 20a, which mirror has light directed at it by the reflector 72a of the light source 69a. The synchronous shutter includes a permanent magnet 125 having one pole shorter than the other and having a soft-iron pole extension 126 attached to the shorter pole, with an alternating current coil 127 wound thereon for energization by wires 128 and 129 from the A. C. source of supply associated with the reversible slide wire motor of the system.

A thin steel reed 130 is supported vertically at the longer pole of the permanent magnet in such a manner that it may vibrate freely back and forth before the end of the soft-iron pole piece 126 carrying the coil 127. Attached to the steel reed 130 is an aluminum vane 131 which moves back and forth across openings 132 and 133 in a flat shutter piece 134 vertically supported behind the vane by brackets 135. Between the openings 132 and 133 there is provided a light-obstructing portion 136, and it is preferable to have said apertures and said light-obstructing portion of one width, which width is the same as that of the aluminum vane 131.

By having the energizing coil 127 wound on the soft-iron core extension of a permanent magnet 125, the reed 130 will be caused to vibrate in synchronism with the alternating current of the coil, and accordingly, since the coil is energized from the same source which energizes the shaded-pole motor and therefore the thermionic devices for controlling the motor, the vibration of the reed 130 will be synchronized with the alternating charges on the plates of said devices, and deflection of the galvanometer in one direction or the other will result in one or the other of said thermionic devices functioning to cause proper rotation to the shaded-pole motor for establishing a balance of the potentiometer circuit.

In the broader aspects of this invention any suitable form of synchronous shutter other than the particular types disclosed herein may be used.

As in my application above referred to, the pointer 30 which turns with the slider 26 on the slide wire 14 may be used to indicate directly temperatures of the thermocouple 24, and a visible and permanent recording may be had by using a pencil cooperating with a timed control graph sheet. The movement of the sliding contact 26 and shaft 31 may also be used to open or close switches at predetermined times for actuating apparatus for control purposes.

Variations and modifications may be made within the scope of this invention and portions of the improvements may be used without others.

I claim:

1. In combination, an electro-responsive device movable in reverse directions and having control circuits; means selectively controlled according to the phase position of a periodic current, and connected with the circuits of said electro-responsive device for causing the latter to move in either one direction or the other; light responsive means for operating said means for causing movement of the electro-responsive device; and means for controlling a beam of light to intermittently strike said light responsive means according to a constant period having one phase position or according to a similar period having another phase position, so as to cause movement of the electro-responsive means in one direction or the other.

2. In combination, light-sensitive current producing means; means, including a deflectable light-directing member, for controlling a beam of light to intermittently strike said light-sensitive means so that deflection of the member in one direction causes periodic impulses to be set up by said light-sensitive means, and deflection of the member in the other direction causes similarly timed periodic impulses to be set up by said light-sensitive means non-coincident with the first periodic impulses; electro-responsive means movable in reverse directions and having control circuits; and means connected with the light-sensitive means and with the control circuits of the electro-responsive means for selectively responding to the periodic impulses of the light-sensitive means so as to cause movement of the electro-responsive means in one direction or the other, the direction of movement depending on whichever particular set of periodic impulses is being set up by the light responsive means in responding to the deflectable member.

3. In a system for effecting a control in response to change in magnitude of a condition, the method which comprises varying a resistance in an electric circuit carrying current of constant magnitude to produce a constant frequency electric current dependent in phase position upon the sense of change in the magnitude of said condition, and selectively directing said current through one of a plurality of circuits for effecting a control.

4. In a system for effecting a control in response to change in magnitude of a condition, the method which comprises producing a constant frequency and constant magnitude electric current dependent in phase position upon the sense of change in the magnitude of said condition, and selectively directing said current through one of a plurality of circuits for effecting a control.

5. In a system for effecting a control in response to change in magnitude of a condition, the method which comprises producing an electric current of constant frequency and magnitude whose phase position is dependent upon the sense of change in the magnitude of said condition, and selectively directing said current according to its phase position through one of a plurality of circuits for effecting a control.

6. In a system for effecting a control in response to change in magnitude of a condition, the method which comprises producing a periodically interrupted beam of radiant energy having a constant period, and whose phase position is dependent upon the sense of change in the magnitude of said condition, effective variations in an electric current corresponding in time with the period of said beam, and selectively directing said current through one of a plurality of circuits for effecting a control.

7. In a system for effecting a control in response to change in magnitude of a condition, the method which comprises producing an electric current, varying the resistance of a light-sensitive cell in the circuit traversed by said current to produce fluctuations of the current according to a constant frequency and so that the phase position of said current is representative of the sense of change in magnitude of said condition, and selectively directing said current through control circuits.

8. In a system for effecting a control in response to change in magnitude of a condition, the method which comprises producing a constant frequency and constant magnitude electric current dependent in phase position upon the sense of change in the magnitude of said condition, and selectively directing said current through one of a plurality of circuits for effecting a control while at the same time amplifying the current.

9. In a system for effecting a control in response to change in magnitude of a condition, the method which comprises producing a constant frequency and constant magnitude electric current dependent in phase position upon the sense of change in the magnitude of said condition, and directing said current through a selecting relay to control one of a plurality of circuits.

10. In a system for effecting a control in response to change in magnitude of a condition, the method which comprises producing an electric current of constant frequency and magnitude, and phase displacing said current substantially 90° in response to change in the magnitude of said condition, and selectively directing said current according to its phase position through one of a plurality of circuits for effecting a control.

11. In a system for effecting a control in response to change in magnitude of a condition, the method which comprises producing a constant frequency electric current dependent in phase position upon the sense of change in the magnitude of said condition, directing said current to a plurality of relays, each responding to a different predetermined phase position of the current, and operating an electro-responsive control by said relays.

12. In a system for effecting a control in response to change in magnitude of a condition, the method which comprises producing a constant frequency electric current dependent in phase position upon the sense of change in the magnitude of said condition, directing said current to a plurality of electron-emission devices, each responding to a different predetermined phase position of the current, and operating an electro-responsive control by said devices.

13. In a system for effecting a control in response to change in magnitude of a condition, the method which comprises producing a constant frequency electric current dependent in phase position upon the sense of change in the magnitude of said condition, and directing said current to a plurality of electro-responsive devices, each responding to a different predetermined phase position of the current, for effecting a control.

14. A system for effecting a control in response to change in magnitude of a condition, comprising means for producing an electric current; means for producing constant frequency fluctuations in said current and for phase displacing the current in response to change in the magnitude of said condition; means for causing said current to selectively flow, according to its phase position, through one of a plurality of circuits; and electro-responsive means selectively traversed by the current for effecting a control.

15. A system for effecting a control in response to change in magnitude of a condition, comprising means for producing an electric current; means for producing constant frequency fluctuations of a constant magnitude in said current and for phase displacing the current in response to change in the magnitude of said condition; means for causing said current to selectively flow, according to its phase position, through one of a plurality of circuits including means for amplifying said current; and electro-responsive means selectively traversed by the current for effecting a control.

16. A control apparatus comprising a source of light; a light-sensitive cell; deflecting means responsive to change in magnitude of a condition for directing a beam of light from said source upon the light-sensitive cell; means for producing constant frequency pulsations in said beam having a phase position dependent upon the direction of deflection of said deflecting means with respect to a neutral position; and electrical control circuits connected to said light-sensitive cell.

17. A control apparatus comprising a deflecting member; reflecting means associated with said member for directing a beam of radiant energy upon a variable resistance cell included in an electric circuit; and means for producing constant frequency pulsations in said beam having a phase position dependent upon the direction of deflection of said member whereby there is produced a fluctuating current in said circuit which is phase displaced according to the direction of deflection of the deflecting member.

18. A system for effecting a control in response to change in magnitude of a variable, comprising current-producing means and a circuit therefor; a resistance in said circuit; means for varying the resistance in response to change in the magnitude of said condition to produce constant frequency fluctuations in said current and to phase displace the current in response to change in said condition; means for causing said current to selectively flow, according to its phase position, through one of a plurality of circuits; and electro-responsive means selectively traversed by the current for effecting a control.

19. A system for effecting a control in response to change in magnitude of a variable, comprising current-producing means and a circuit therefor; a light-responsive cell in said circuit; means responsive to changes in the magnitude of said condition for directing a beam of radiant energy upon said cell; means for producing constant frequency pulsations in said beam having a phase position dependent upon the sense of change in the magnitude of said condition whereby there is produced a fluctuating current in said circuit which is phase displaced according to the sense of change in the condition; means for causing said current to selectively flow, according to its phase position, through one of a plurality of circuits; and electro-responsive means selectively traversed by the current, for effecting a control.

20. A system for effecting a control in response to change in magnitude of a condition, comprising means for producing an electric current; means for producing constant frequency fluctuations in said current and for phase displacing said current in response to change in the magnitude of said condition; relay means selectively responsive to the phase position of the current fluctuations for directing said current through one of a plurality of control circuits; and electro-responsive means connected with said control circuits and selectively traversed by the current for effecting a control.

21. A system for effecting a control in response to change in magnitude of a condition, comprising means for producing an electric current; means for producing constant frequency fluctuations in said current and for phase displacing said current in response to change in the magnitude of said condition; a plurality of electron-emission devices connected to said current-producing means; means for energizing said devices to cause them to selectively respond to the phase positions of the fluctuating current; and electro-responsive means connected with said devices and controlled according to the selective responses thereof.

22. A system for effecting a control in response to change in magnitude of a condition, comprising means for producing an electric current; means for producing constant frequency fluctuations in said current and for phase displacing said current in response to change in the magnitude of said condition; a plurality of electron-emission devices connected to said current-producing means; and means, including an electro-responsive mechanism connected to and controlled by said devices, for energizing the devices to cause them to selectively respond to the phase positions of the fluctuating current for effecting control of said mechanism.

23. A system for effecting a control in response to change in magnitude of a variable, comprising current-producing means and a circuit therefor; a light-responsive cell in said circuit; means for producing a beam of radiant energy to actuate said cell; means, including a shutter for periodically interrupting the beam, and a beam-directing device responsive to changes in the magnitude of said condition, for producing constant frequency pulsations in the beam having a phase position dependent upon the sense of change in the magnitude of said condition whereby there is produced a fluctuating current in said circuit which is phase displaced according to the sense of change in the condition; means for causing said current to selectively flow, according to its phase position, through one of a plurality of circuits; and electro-responsive means selectively traversed by the current, for effecting a control.

24. A control system comprising a selectively controlled electro-responsive means; a pair of electron-emission devices connected with said means so that respective functioning of said devices will selectively control said means; means for energizing said devices in phase opposition so that they are in condition to function alternately; means for producing a control current, and a circuit therefor connected to said devices; means for producing constant frequency fluctuations in said current synchronized with the energization of the emission devices so that only one device will operate; and means for shifting the phase relationship of said current relatively to the energization of the emission devices so that the other device will operate.

25. A system for effecting a control in response to change in magnitude of a condition, comprising means for producing an electric current; means for producing constant frequency fluctuations in said current and for phase displacing said current to a substantially quadrature position in response to change in the magnitude of said condition; a pair of electron-emission devices connected to said current-producing means; means for energizing said devices in phase opposition to cause them to selectively respond to the phase positions of the fluctuating current; and electro-responsive means connected with said devices and controlled according to the selective responses thereof.

26. In a system for effecting a control in response to change of magnitude of a condition, the method which comprises varying a resistance in an electric circuit to produce an intermittent direct current flowing always in one direction and having a frequency dependent in phase position upon the sense of change in the magnitude of said condition, and selectively directing said current through one of a plurality of circuits for effecting a control.

27. In a system for effecting a control in response to change in magnitude of a condition, the method which comprises producing a fluctuating direct current of constant frequency, and phase displacing said current in response to change in the magnitude of said condition, and selectively directing said current through one of a plurality of circuits for effecting a control.

28. In a system for effecting a control in response to change in magnitude of a condition, the method which comprises producing an alternating electric current of constant frequency and magnitude, and phase displacing said current in response to change in the magnitude of said condition, and selectively directing said current through one of a plurality of circuits for effecting a control.

29. In a system for effecting a control in response to change in magnitude of a condition, the method which comprises producing an alternating electric current of constant frequency and magnitude, the phase position of which is dependent upon the sense of change in the magnitude of said condition, and selectively directing said current according to its phase position through one of a plurality of circuits for effecting a control.

30. In a system for effecting a control in response to change in magnitude of a condition, the method which comprises varying a resistance in an electric circuit to produce a constant frequency electric current dependent in phase position upon said variation, altering the variation of said resistance so that the phase position of the current changes with the sense of change in the magnitude of said condition, and selectively directing said current through one of a plurality of circuits for effecting a control.

31. A system for effecting a control in response to change in magnitude of a condition, comprising means for producing an electric current; means for producing constant frequency fluctuations in said current and for phase displacing the current without reversing the flow thereof in response to change in the magnitude of said condition; means for causing said current to selectively flow, according to the phase position, through one of a plurality of circuits; and electro-responsive means selectively traversed by the current for effecting a control.

32. In a potentiometer system, an adjustable slide wire and circuit therefor; means for adjusting the slide wire, including an electro-responsive device operative in reverse directions; control circuits connected with said device; a light-sensitive cell connected to said control circuits; a source of light; means for directing a beam of light from said source upon the light-sensitive cell; means for deflecting said directing means in either of opposite directions from a neutral position in response to energy change in the slide wire circuit; means for producing constant frequency pulsations in said beam having a phase position dependent upon the direction of deflection of said light-directing means with respect to the neutral position so that a pulsating current flows in the control circuits with a phase position corresponding to that of the pulsations in the light beam; and means for selectively operating the electro-responsive device directionally according to the phase position of the pulsating current in said control circuits to adjust the slide wire.

33. In a potentiometer system, an adjustable slide wire and circuit therefor; means for adjusting the slide wire, including an electro-responsive device operative in reverse directions; control circuits connected with said device; a light-sensitive cell connected to said control circuits; a source of light; means for directing a beam of light from said source upon the light-sensitive cell; means for deflecting said directing means in either of opposite directions from a neutral position in response to energy change in the slide wire circuit; means for producing constant frequency pulsations in said beam having a phase position dependent upon the direction of deflection of said light-directing means with respect to a neutral position so that a pulsating current flows in the control circuits with a phase position corresponding to that of the pulsations in the light beam, the frequency of said pulsations being relatively rapid with respect to the deflecting movement of said directing means so that at least several pulsations occur during any deflection; and means for selectively operating the electro-responsive device directionally according to the phase position of the pulsating current in said control circuits to adjust the slide wire.

34. In a potentiometer system, an adjustable slide wire and circuit therefor; means for adjusting the slide wire including a reversible A. C. motor having a continuously energized field and oppositely disposed wire wound shading coils; control circuits connected with said shading coils; a light-sensitive cell connected to said control circuits; a source of light; means for directing a beam of light from said source upon the light-sensitive cell; a galvanometer connected in the slide wire circuit and operating said directing means to deflect same in either of opposite directions from a neutral position in response to energy change in the slide wire circuit; means for producing constant frequency pulsations in said beam having a phase position dependent upon the direction of deflection of the galvanometer so that a pulsating current flows in the control circuits having a phase position corresponding to that of the pulsations in the light beam; and means for selectively controlling the shading coils to operate the electro-responsive device directionally according to the phase position of the pulsating current in said control circuits to adjust the slide wire.

35. The invention as defined in claim 32, in which the means for producing constant frequency pulsations in the beam includes a shutter, and a synchronous electro-magnetic device for operating the shutter.

MANFRED J. JOHNSON.